(12) United States Patent
Jiang et al.

(10) Patent No.: US 10,404,697 B1
(45) Date of Patent: *Sep. 3, 2019

(54) SYSTEMS AND METHODS FOR USING VEHICLES AS INFORMATION SOURCES FOR KNOWLEDGE-BASED AUTHENTICATION

(71) Applicant: Symantec Corporation, Mountain View, CA (US)

(72) Inventors: Kevin Jiang, Lafayette, CA (US); Ilya Sokolov, Boston, MA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/979,620

(22) Filed: Dec. 28, 2015

(51) Int. Cl.
*G05B 19/00* (2006.01)
*H04L 29/06* (2006.01)
*H04W 12/06* (2009.01)
*H04L 29/08* (2006.01)

(52) U.S. Cl.
CPC .......... *H04L 63/0876* (2013.01); *H04L 67/12* (2013.01); *H04W 12/06* (2013.01)

(58) Field of Classification Search
CPC ..... H04L 63/0876; H04L 67/12; H04W 12/06
See application file for complete search history.

(56) References Cited

U.S. PATENT DOCUMENTS

| 6,100,811 | A | * | 8/2000 | Hsu | B60H 1/00642 340/426.36 |
|---|---|---|---|---|---|
| 6,970,183 | B1 | | 11/2005 | Monroe | |
| 7,925,751 | B1 | | 4/2011 | Bolinger et al. | |

(Continued)

FOREIGN PATENT DOCUMENTS

| CN | 101950332 A | 1/2011 |
|---|---|---|
| CN | 202795383 U | 3/2013 |

(Continued)

OTHER PUBLICATIONS

Evgenios Kornaropoulos, et al; Systems and Methods for Securely Detecting Data Similarities; U.S. Appl. No. 14/871,868, filed Sep. 30, 2015.

(Continued)

*Primary Examiner* — Carl G Colin
*Assistant Examiner* — Vance M Little
(74) *Attorney, Agent, or Firm* — FisherBroyles, LLP

(57) ABSTRACT

The disclosed computer-implemented method for using vehicles as information sources for knowledge-based authentication may include (1) identifying a vehicle belonging to a user who is attempting to authenticate with an identity-verification authority, (2) acquiring analytic information about the vehicle, (3) generating, by analyzing the analytic information about the vehicle, at least one authentication question, where the correct response to the authentication question requires knowledge about the vehicle, (4) presenting the authentication question to the user, and (5) authenticating the identity of the user based on the user responding correctly to the authentication question. Various other methods, systems, and computer-readable media are also disclosed.

18 Claims, 7 Drawing Sheets

(56) References Cited

U.S. PATENT DOCUMENTS

| | | |
|---|---|---|
| 8,316,421 B2 | 11/2012 | Etchegoyen |
| 8,620,841 B1 | 12/2013 | Filson |
| 8,726,405 B1 | 5/2014 | Bailey |
| 8,925,037 B2 | 12/2014 | Marino et al. |
| 9,154,466 B2 | 10/2015 | Sobel et al. |
| 9,171,178 B1 | 10/2015 | Banerjee |
| 9,202,173 B1 | 12/2015 | Dotan et al. |
| 9,218,468 B1 | 12/2015 | Rappaport |
| 9,282,435 B2 | 3/2016 | Ward et al. |
| 9,396,599 B1 | 7/2016 | Malhotra |
| 9,661,483 B2 | 5/2017 | Bastianelli |
| 9,697,660 B1 | 7/2017 | Sokolov et al. |
| 9,817,958 B1 | 11/2017 | McCorkendale |
| 2002/0059532 A1* | 5/2002 | Ata .................. B60R 25/20 726/28 |
| 2003/0172280 A1 | 9/2003 | Scheidt |
| 2003/0216143 A1 | 11/2003 | Roese |
| 2004/0153671 A1 | 8/2004 | Schuyler et al. |
| 2005/0097320 A1 | 5/2005 | Golan et al. |
| 2006/0031682 A1 | 2/2006 | Sakai et al. |
| 2006/0082439 A1 | 4/2006 | Bazakos et al. |
| 2006/0164282 A1 | 7/2006 | Duff et al. |
| 2006/0210167 A1 | 9/2006 | Inoue |
| 2007/0171921 A1 | 7/2007 | Wookey |
| 2009/0043445 A1* | 2/2009 | Bishop ................ G07C 5/008 701/29.5 |
| 2010/0005526 A1 | 1/2010 | Tsuji |
| 2010/0014721 A1 | 1/2010 | Steinberg |
| 2010/0024042 A1 | 1/2010 | Motahari |
| 2010/0205667 A1 | 8/2010 | Anderson |
| 2010/0299002 A1* | 11/2010 | Abdallah ............ G06Q 50/265 701/2 |
| 2010/0302143 A1 | 12/2010 | Spivack |
| 2010/0325712 A1 | 12/2010 | Kakuta et al. |
| 2011/0206285 A1 | 8/2011 | Hodge |
| 2011/0219423 A1 | 9/2011 | Aad et al. |
| 2011/0219427 A1 | 9/2011 | Hito |
| 2011/0247069 A1 | 10/2011 | Slater |
| 2011/0252131 A1 | 10/2011 | Karaoguz |
| 2011/0293095 A1 | 12/2011 | Ben Ayed |
| 2011/0321137 A1 | 12/2011 | Iida |
| 2011/0321143 A1 | 12/2011 | Angaluri et al. |
| 2012/0011559 A1 | 1/2012 | Miettinen et al. |
| 2012/0044089 A1* | 2/2012 | Yarnold ................ G08G 1/202 340/901 |
| 2012/0079576 A1 | 3/2012 | Han et al. |
| 2012/0181333 A1 | 7/2012 | Krawczewicz |
| 2012/0185910 A1 | 7/2012 | Miettinen |
| 2012/0190386 A1 | 7/2012 | Anderson |
| 2012/0198570 A1 | 8/2012 | Joa |
| 2012/0239929 A1 | 9/2012 | Newman |
| 2012/0243687 A1 | 9/2012 | Li |
| 2012/0246739 A1 | 9/2012 | Mebed |
| 2012/0331527 A1 | 12/2012 | Walters et al. |
| 2013/0010966 A1 | 1/2013 | Li |
| 2013/0097709 A1 | 4/2013 | Basavapatna |
| 2013/0102283 A1 | 4/2013 | Lau |
| 2013/0103482 A1 | 4/2013 | Song |
| 2013/0104203 A1 | 4/2013 | Davis |
| 2013/0151617 A1 | 6/2013 | Davis |
| 2013/0159876 A1 | 6/2013 | Narasimhan et al. |
| 2013/0177157 A1 | 7/2013 | Li |
| 2013/0197998 A1 | 8/2013 | Buhrmann et al. |
| 2013/0227712 A1 | 8/2013 | Salem |
| 2013/0275498 A1 | 10/2013 | Cheng et al. |
| 2013/0290201 A1 | 10/2013 | Rodriguez Carrillo |
| 2013/0298248 A1 | 11/2013 | Boldrev |
| 2013/0318580 A1 | 11/2013 | Gudlavenkatasiva et al. |
| 2013/0318625 A1 | 11/2013 | Fan |
| 2013/0340089 A1 | 12/2013 | Steinberg |
| 2014/0007225 A1 | 1/2014 | Gay |
| 2014/0025485 A1 | 1/2014 | Niemeijer |
| 2014/0040137 A1 | 2/2014 | Carlson |
| 2014/0067679 A1 | 3/2014 | O'Reilly |
| 2014/0068702 A1 | 3/2014 | Hyndman |
| 2014/0082715 A1 | 3/2014 | Grajek |
| 2014/0123255 A1 | 5/2014 | Etchegoyen |
| 2014/0130127 A1 | 5/2014 | Toole |
| 2014/0173700 A1 | 6/2014 | Awan |
| 2014/0189786 A1 | 7/2014 | Castro |
| 2014/0201377 A1 | 7/2014 | Kadishay et al. |
| 2014/0282870 A1* | 9/2014 | Markwordt ............ H04L 63/08 726/3 |
| 2014/0380444 A1* | 12/2014 | Kelley .................. H04L 63/08 726/7 |
| 2015/0019873 A1* | 1/2015 | Hagemann .......... H04L 63/0861 713/186 |
| 2015/0082399 A1 | 3/2015 | Wu |
| 2015/0089231 A1 | 3/2015 | Oxford |
| 2015/0237038 A1* | 8/2015 | Grajek ............... H04L 63/0815 726/8 |
| 2015/0288687 A1 | 10/2015 | Heshmati et al. |
| 2015/0324559 A1 | 11/2015 | Boss |
| 2015/0363986 A1* | 12/2015 | Hoyos ................ G07C 9/00563 340/5.61 |
| 2016/0007083 A1 | 1/2016 | Gurha |
| 2016/0012655 A1 | 1/2016 | Hanson |
| 2016/0044001 A1 | 2/2016 | Pogorelik |
| 2016/0057110 A1 | 2/2016 | Li |
| 2016/0063640 A1* | 3/2016 | Ellingsworth ......... G06Q 40/08 701/31.4 |
| 2016/0068264 A1 | 3/2016 | Ganesh |
| 2016/0082926 A1* | 3/2016 | Mouser ................ B60R 25/252 701/2 |
| 2016/0087950 A1 | 3/2016 | Barbir |
| 2016/0112522 A1 | 4/2016 | Abello |
| 2016/0112871 A1 | 4/2016 | White |
| 2016/0132684 A1 | 5/2016 | Barbas |
| 2016/0140257 A1 | 5/2016 | Vega |
| 2016/0164922 A1 | 6/2016 | Boss |
| 2016/0165650 A1 | 6/2016 | Kim |
| 2016/0165651 A1 | 6/2016 | Pathuri et al. |
| 2016/0212109 A1 | 7/2016 | Hird |
| 2016/0241390 A1 | 8/2016 | Harris |
| 2016/0316449 A1 | 10/2016 | Pitt |
| 2016/0358441 A1 | 12/2016 | Mittleman |
| 2017/0053280 A1* | 2/2017 | Lishok ............... G06Q 20/4014 |
| 2017/0083345 A1 | 3/2017 | Sol |
| 2017/0163666 A1 | 6/2017 | Venkatramani |
| 2017/0255940 A1 | 9/2017 | Kohli |
| 2018/0027517 A1 | 1/2018 | Noonan |
| 2018/0103021 A1 | 4/2018 | Arunkumar |
| 2018/0211464 A1 | 7/2018 | Kusens |
| 2018/0212976 A1 | 7/2018 | Arunkumar |
| 2018/0249398 A1 | 8/2018 | Hillary |

FOREIGN PATENT DOCUMENTS

| | | | |
|---|---|---|---|
| CN | 103354931 A | 10/2013 | |
| EP | 1 703 431 A2 | 9/2006 | |
| EP | 3166086 A1 * | 5/2017 | ............ G07C 5/008 |
| JP | 2006259930 A | 9/2006 | |
| JP | 2007293062 A | 11/2007 | |
| JP | 2007304834 A | 11/2007 | |
| JP | 2009086891 A | 4/2009 | |
| JP | 2009140051 A | 6/2009 | |
| JP | 2010128778 A | 5/2010 | |
| JP | 2011004214 A | 1/2011 | |
| JP | 2011134137 A | 7/2011 | |
| JP | 20120235424 A | 11/2012 | |
| JP | 2012248027 A | 12/2012 | |
| JP | 20130246465 A | 12/2013 | |
| JP | 2014086865 A | 5/2014 | |
| WO | WO 2012/162009 A1 | 11/2012 | |
| WO | 2013101215 A1 | 7/2013 | |

OTHER PUBLICATIONS

Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).

(56) References Cited

OTHER PUBLICATIONS

Snapshot; https://www.progressive.com/auto/snapshot/, as accessed Nov. 18, 2015; Progressive Casualty Insurance Company; On or before Nov. 18, 2015.
FasTrak; https://www.bayareafastrak.org/en/howitworks/gettingstarted.shtml, as accessed Nov. 18, 2015; On or before Nov. 18, 2015.
E-ZPass, https://www.e-zpassny.com/en/home/index.shtml, as accessed Nov. 18, 2015, (On or before Nov. 18, 2015).
Fastpass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/default.aspx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).
Bruce McCorkendale; Systems and Methods for Authenticating Users; U.S. Appl. No. 14/834,949, filed Aug. 25, 2015.
Ilya Sokolov, et al; Systems and Methods for Verifying User Attributes; U.S. Appl. No. 14/985,675, filed Dec. 31, 2015.
Ilya Sokolov, et al; Systems and Methods for Evaluating Identity Intensity; U.S. Appl. No. 15/057,618, filed Mar. 1, 2016.
Home—Good Security Questions; http://goodsecurityquestions.com/, as accessed Jun. 25, 2015, (Dec. 27, 2007).
Fake GPS Location app, https://play.google.com/store/apps/details?id=com.lexa.fakegps&hl=en, as accessed Feb. 23, 2017, Lexa Tools.
How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.
Assisted GPS, https://en.wikipedia.org/wiki/Assisted_GPS, as accessed Feb. 24, 2017, Wikipedia.
Lei Gu, et al; Systems and Methods for Enforcing Access-Control Policies; U.S. Appl. No. 15/194,403, filed Jun. 27, 2016.
HomeNews—WiFi can be used to count people with or without electronic gadgets; https://www.rt.com/news/266188-wifi-signal-human-density/; as accessed on Jun. 21, 2016; Jun. 10, 2015.
Ali et al.; Keystroke Recognition Using WiFi Signals; https://www.sigmobile.org/mobicom/2015/papers/p90-aliA.pdf; Sep. 7, 2015.
iRobot's Roomba 980 Maps Your Home via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.
Microsoft Hololens; https://www.microsoft.com/microsoft-hololens/en-us; as accessed on Jun. 21, 2016.
Bruce McCorkendale, et al; Systems and Methods for Constructing a Volumetric Model of a Space from a Constellation of Sensing Devices; U.S. Appl. No. 14/833,655, filed Aug. 24, 2015.
Daniel Marino, et al; Systems and Methods for Enforcing Data-Loss-Prevention Policies Using Mobile Sensors; U.S. Appl. No. 13/733,131, filed Jan. 2, 2013.
Devicelock; Preventing Devastating Data Leaks by Securing the Endpoints of Your Network; http://www.devicelock.com/products/, as accessed on Sep. 10, 2012.
Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.
OMA Device Management; http://openmobilealliance.org/about-oma/work-program/device-management/, as accessed Jun. 25, 2015; Jan. 15, 2013.
Open Mobile Alliance (OMA); http://openmobilealliance.org/, as accessed Jun. 25, 2015; Aug. 2, 2002.
OpenHAB; http://www.openhab.org/, as accessed Jun. 25, 2015; Jul. 11, 2011.
Daniel Siewiorek; SenSay: A Context-Aware Mobile Phone; Human Computer Interaction and Institute for Complex Engineered Systems; As accessed on Sep. 10, 2012.
Megan Treacy; 10 environmental sensors that go along with you; http://www.treehugger.com/clean-technology/environmental-sensors.html, as accessed Jun. 25, 2015; Mar. 5, 2013.
Zenprise; Mobile DLP (Data Leakage Prevention); http://www.zenprise.com/solutions/mobile-data-leakage-prevention/, as accessed on Sep. 10, 2012.
Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.
Jason Franklin et al.; Passive Data Link Layer 802.11 Wireless Device Driver Fingerprinting; Proceedings of USENIX Security '06, Jul. 31-Aug. 4, 2006, Vancouver, BC, Canada.
School of Privacy, Guide on How to be Safe, Secure and Protect Your Online Anonymity; Fake GPS Location—Android; http://school-of-privacy.com/post/70381068300/fake-gps-location-andoid; Dec. 18, 2013.
SensorSimulator; https://code.google.com/p/openintents/wiki/SensorSimulator; Jan. 12, 2013.
William E. Sobel, et al.; Systems and Methods for Introducing Variation in Sub-System Output Signals to Prevent Device Fingerprinting; U.S. Appl. No. 14/139,824, filed Dec. 23, 2013.
C. Rigney et al; Remote Authentication Dial in User Service (RADIUS); https://tools.ietf.org/html/rfc2865, as accessed Nov. 6, 2015; Request for Comments: 2865; Jun. 2000.
C. Neuman et al; The Kerberos Network Authentication Service (V5); https://tools.ietf.org/html/rfc4120, as accessed Nov. 6, 2015; Request for Comments: 4120; Jul. 2005.
Kerberos: The Network Authentication Protocol; http://web.mit.edu/kerberos/, as accessed Nov. 6, 2016; Jan. 28, 1999.
Microsoft Negotiate; https://msdn.microsoft.com/en-us/library/windows/desktop/aa378748(v=vs.85).aspx. as accessed Nov. 6, 2015; Nov. 13, 2011.
Microsoft NTLM; https://msdn.microsoft.com/en-us/library/windows/desktop/aa378749(v=vs.85).aspx, as accessed Nov. 6, 2015; Nov. 12, 2011.
Prasad Bokare, et al; Systems and Methods for Facilitating Single Sign-On for Multiple Devices; U.S. Appl. No. 15/041,040, filed Feb. 11, 2016.
Symantec Identity Access Manager; https://www.symantec.com/identity-access-manager/, as accessed Nov. 6, 2015; Symantec Corporation; Nov. 7, 2014.
Symantec Validation and ID Protection Service; http://www.symantec.com/vip-authentication-service/, as accessed Nov. 6, 2015; Symantec Corporation; Feb. 10, 2014.
Ramakrishnan Meenakshi Sundaram; Systems and Methods for Managing Smart Building Systems; U.S. Appl. No. 15/041,002, filed Feb. 10, 2016.
ZigBee Alliance, http://www.zigbee.org/, as accessed Dec. 14, 2015, (Nov. 14, 2001).
Z-Wave, http://www.z-wave.com/, as accessed Dec. 14, 2015, (Dec. 23, 2002).
OMA Device Management Working Group, http://openmobilealliance.org/about-oma/work-program/device-management/, as accessed Dec. 14, 2015, (Jan. 15, 2013).
Lei Gu, et al; Systems and Methods for Enforcing Access-Control Policies in an Arbitrary Physical Space; U.S. Appl. No. 15/195,677, filed Jun. 28, 2016.
Ilya Sokolov et al; Systems and Methods for Certifying Geolocation Coordinates of Computing Devices; U.S. Appl. No. 15/466,156, filed Mar. 22, 2017.
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.

(56) References Cited

OTHER PUBLICATIONS

Norton Identity Safe, announced Aug. 28, 2007: https://identitysafe.norton.com/.
Abadi et al, Traffic Flow Predicition for Road Transporation Networks with Limited Traffic Data, IEEE, vol. 16, No. 2, Apr. 2015, pp. 653-662.
Baek et al, An Authentication Framework for Automatic Dependent Survelliance-Broadcast Based on Online/Offline Identity-Based Signature, IEEE, 2013, pp. 358-363.
Michael Buhrmann, et al.; Mobile Wallet Security; U.S. Appl. No. 61/591,232, filed Jan. 26, 2012.
Malek Ben Salem, et al.; Adaptive Risk-Based Access Controls; U.S. Appl. No. 61/602,427, filed Feb. 23, 2012.

\* cited by examiner

SYSTEMS AND METHODS FOR USING VEHICLES AS INFORMATION SOURCES FOR KNOWLEDGE-BASED AUTHENTICATION

BACKGROUND

Many online services, such as government benefits websites and online banking websites, require a user to prove their identity before they can set up or access account information. A variety of traditional methods for establishing a user's identity exist, such as mailing a confirmation code to the user and having the user input the confirmation code into the website. In some examples, a service may have a user create a secret question and answer set, such as those found in password reset systems. Other services may utilize methods that do not require the user to have previously established secret questions. For example, a service may skim information about the user from combinations of publicly and privately available information, such as credit reports, transaction histories, etc., to generate authentication questions.

However, these existing verification methods suffer from a variety of flaws. Mailed confirmation codes are slow and susceptible to all the vulnerabilities of paper mail, such as being incorrectly delivered, lost, or even intercepted. Answers to questions derived from publicly available information may be ascertained by a determined attacker with access to ever-stronger search engines. Even questions derived from privately held information may be at risk, as personal information such as credit history may be readily available through illicit channels or obtain via hacking. The instant disclosure, therefore, identifies and addresses a need for improved systems and methods by which to generate knowledge-based authentication questions.

SUMMARY

As will be described in greater detail below, the instant disclosure describes various systems and methods for using vehicles as information sources for knowledge-based authentication by collecting analytic information about the vehicle and generating authentication questions based on the collected information. In one example, a computer-implemented method for using vehicles as information sources for knowledge-based authentication may include (1) identifying a vehicle belonging to a user who is attempting to authenticate with an identity-verification authority, (2) acquiring analytic information about the vehicle, (3) generating at least one authentication question, where the correct response to the authentication question requires knowledge about the vehicle, (4) presenting the authentication question to the user, and (5) authenticating the identity of the user based on the user responding correctly to the authentication question.

In some examples, identifying the vehicle belonging to the user may include requesting personally identifying information from the user. Additionally, in some embodiments, identifying the vehicle belonging to the user may further include querying a government-managed database of vehicle owners using the personally identifying information provided by the user.

In some embodiments, acquiring the analytic information about the vehicle may include the vehicle digitally signing the analytic information before transmitting the analytic information. For example, the vehicle may be equipped with a trusted platform module that enables the vehicle to securely provide analytic information to a computing device remote from the vehicle by digitally signing the analytic information before transmitting the analytic information.

In some examples, acquiring the analytic information may include the vehicle transmitting the analytic information via a wireless network. Furthermore, acquiring the analytic information may include storing the analytic information in association with the time at which the analytic information was collected. Additionally or alternatively, acquiring the analytic information may include receiving an aggregate report of analytic information from the vehicle that contains data from more than one sensor of the vehicle.

The analytic information may include a variety of information, including but not limited to (1) a fuel gauge reading, (2) an odometer reading, (3) physical location information, (4) a list of recently played radio stations, (5) a list of media played through an onboard entertainment system, (6) transponder information, and/or (7) a list of devices paired to an internal network that is integrated with the vehicle.

In one embodiment, a system for implementing the above-described method may include (1) an identification module, stored in memory, that identifies a vehicle belonging to a user who is attempting to authenticate with an identity-verification authority, (2) an acquisition module, stored in memory, that acquires analytic information about the vehicle, (3) a generation module, stored in memory, that generates, by analyzing the analytic information about the vehicle, at least one authentication question, where the correct response to the authentication question requires knowledge about the vehicle, (4) a presentation module, stored in memory, that presents the authentication question to the user, (5) an authentication module, stored in memory, that authenticates the identity of the user based on the user responding correctly to the authentication question, and (6) at least one physical processor configured to execute the identification module, the acquisition module, the generation module, the presentation module, and the authentication module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a vehicle belonging to a user who is attempting to authenticate with an identity-verification authority, (2) acquire analytic information about the vehicle, (3) generate, by analyzing the analytic information about the vehicle, at least one authentication question, where the correct response to the authentication question requires knowledge about the vehicle, (4) present the authentication question to the user, and (5) authenticate the identity of the user based on the user responding correctly to the authentication question.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
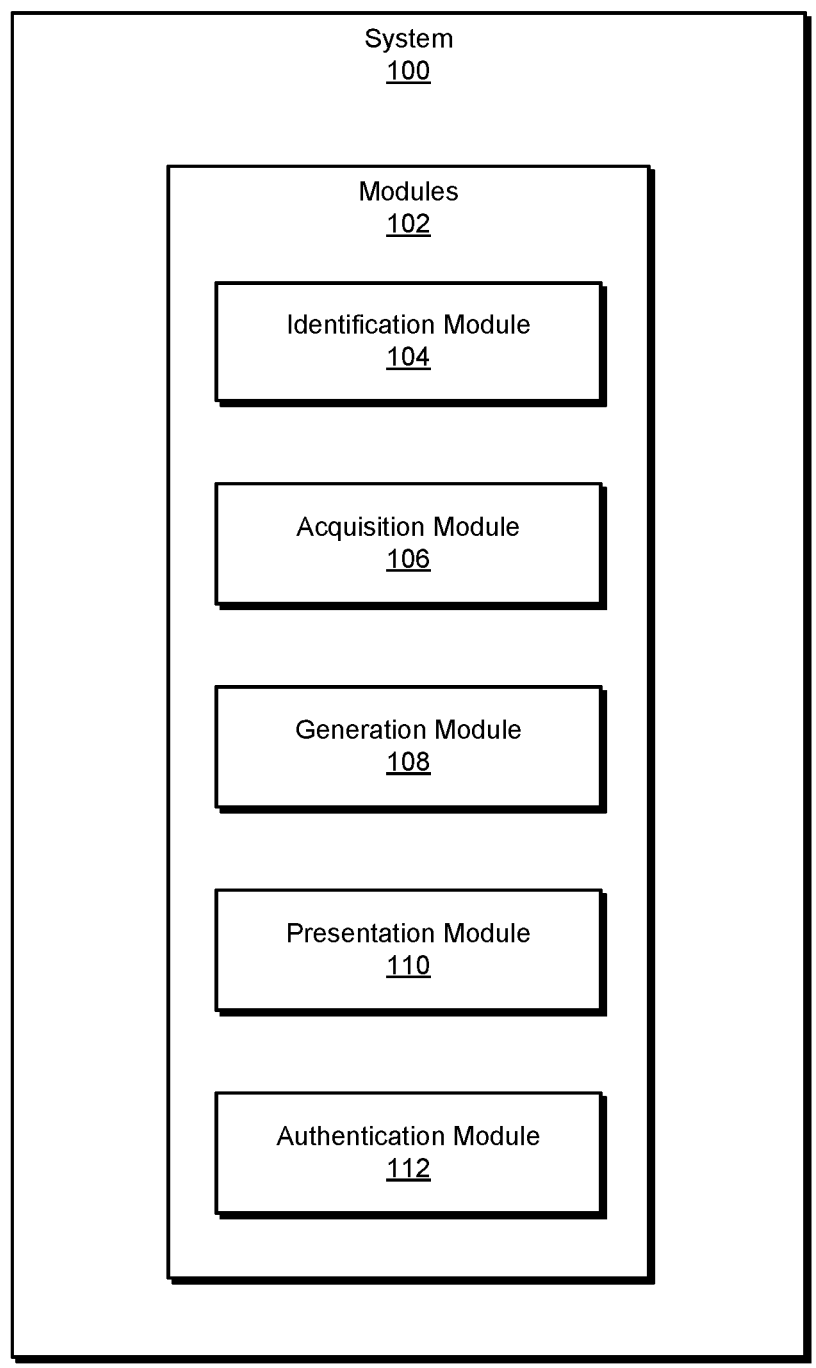
FIG. 1 is a block diagram of an exemplary system for using vehicles as information sources for knowledge-based authentication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using vehicles as information sources for knowledge-based authentication. As will be explained in greater detail below, systems and methods herein may use a person's vehicle as an information source to generate knowledge-based authentication questions by which to verify a user's identity. Because certain information pertaining to the vehicle, such as mileage and remote devices paired to the vehicle's onboard network, may change frequently and be difficult to determine without direct physical access to the vehicle, authentication questions based on information derived from the vehicle may thus be more secure than authentication questions derived from other knowledge sources.

Figure 2:
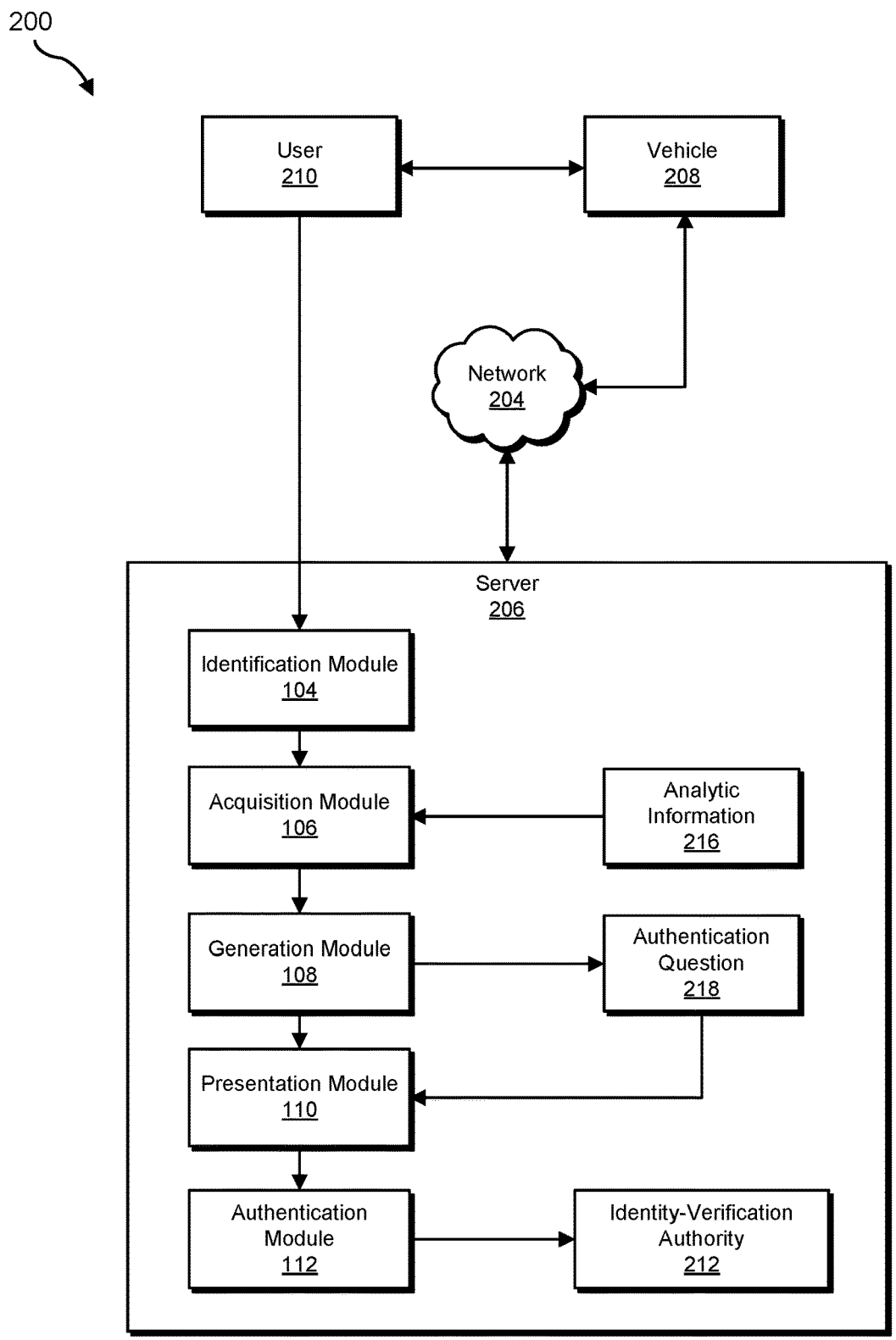
FIG. 2 is a block diagram of an additional exemplary system for using vehicles as information sources for knowledge-based authentication.

The following will provide, with reference to FIGS. 1-2, detailed descriptions of exemplary systems for using vehicles as information sources for knowledge-based authentication. Detailed descriptions of corresponding computer-implemented methods will also be provided in connection with FIG. 3. Further detailed descriptions of exemplary systems for generating authentication questions based on information derived from a person's vehicle will be provided in connection with FIGS. 4-5. Additionally, detailed descriptions of an exemplary computing system and network architecture capable of implementing one or more of the embodiments described herein will be provided in connection with FIGS. 6 and 7, respectively.

FIG. 1 is a block diagram of exemplary system 100 for using vehicles as information sources for knowledge-based authentication. As illustrated in this figure, exemplary system 100 may include one or more modules 102 for performing one or more tasks. For example, and as will be explained in greater detail below, exemplary system 100 may include an identification module 104 that identifies a vehicle belonging to a user who is attempting to authenticate with an identity-verification authority. Exemplary system 100 may additionally include an acquisition module 106 that acquires analytic information about the vehicle. Exemplary system 100 may further include a generation module 108 that generates, by analyzing the analytic information about the vehicle, at least one authentication question. The correct response to the authentication question may require knowledge about the vehicle. Additionally, exemplary system 100 may include a presentation module 110 that presents the authentication question to the user. Moreover, exemplary system 100 may include an authentication module 112 that authenticates the identity of the user based on the user responding correctly to the authentication question. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206 in communication with a server 206 via a network 204. In one example, server 206 may be programmed with one or more of modules 102. In one embodiment, one or more of modules 102 from FIG. 1 may, when executed by at least one processor of server 206, enable server 206 to derive authentication questions using data collected from a user's vehicle. As will be described in greater detail below, one or more of modules 102 may cause server 206 to use a vehicle as an information source for knowledge-based authentication. For example, identification module 104 may identify a vehicle 208 belonging to a user 210 who is attempting to authenticate with an identity-verification authority 212. Acquisition module 106 may acquire analytic information 216 about vehicle 208. Generation module 108 may then generate, by analyzing analytic information 216, at least one authentication question 218, where the correct response to authentication question 218 requires knowledge about vehicle 208. Presentation module 110 may then present authentication question 218 to user 210. Authentication module 112 may authenticate the identity of user 210 based on user 210 responding correctly to authentication question 218.

Server 206 generally represents any type or form of computing device that is capable of collecting and analyzing information gathered from a vehicle. Additionally, server 206 may be capable of producing authentication questions based on a result of the analysis. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between server 206, vehicle 208, and/or a computing device used by user 210.

Vehicle 208 generally represents any motor vehicle (e.g., car, truck, motorcycle, etc.) that is capable of capturing and providing analytic information, such as analytic information 216, to server 206. Examples of analytic information 216 include, without limitation, a fuel gauge reading, an odometer reading, physical location information, a list of recently played radio stations, a list of media played through an onboard entertainment system, transponder information, a list of devices paired to an internal network that is integrated with the vehicle, and/or combinations of the above. Vehicle 208 may include wireless communication capabilities, including but not limited to the ability to transmit information through a cellular network, BLUETOOTH network, a Wireless Local Area Network (WLAN), or any other suitable method of wirelessly transmitting information.

Identity-verification authority 212 generally represents any service, software, hardware, etc., that is capable of determining that a user, such as user 210 in FIG. 2, is in fact who they declare themselves to be. Identity-verification authority 212 may accomplish this by making use of one or more of modules 102, such as authentication module 112. Additionally or alternatively and as outlined in FIG. 5, identity-verification authority 212 may receive authentication questions and their corresponding correct responses (e.g., authentication question 218 in FIG. 2) from modules 102 and use this information to verify a user's identity. In some examples and as will be described in greater detail below, identity-verification authority 212 may control access to a secure service that requires users to validate their identities before accessing the secure service.

Figure 3:
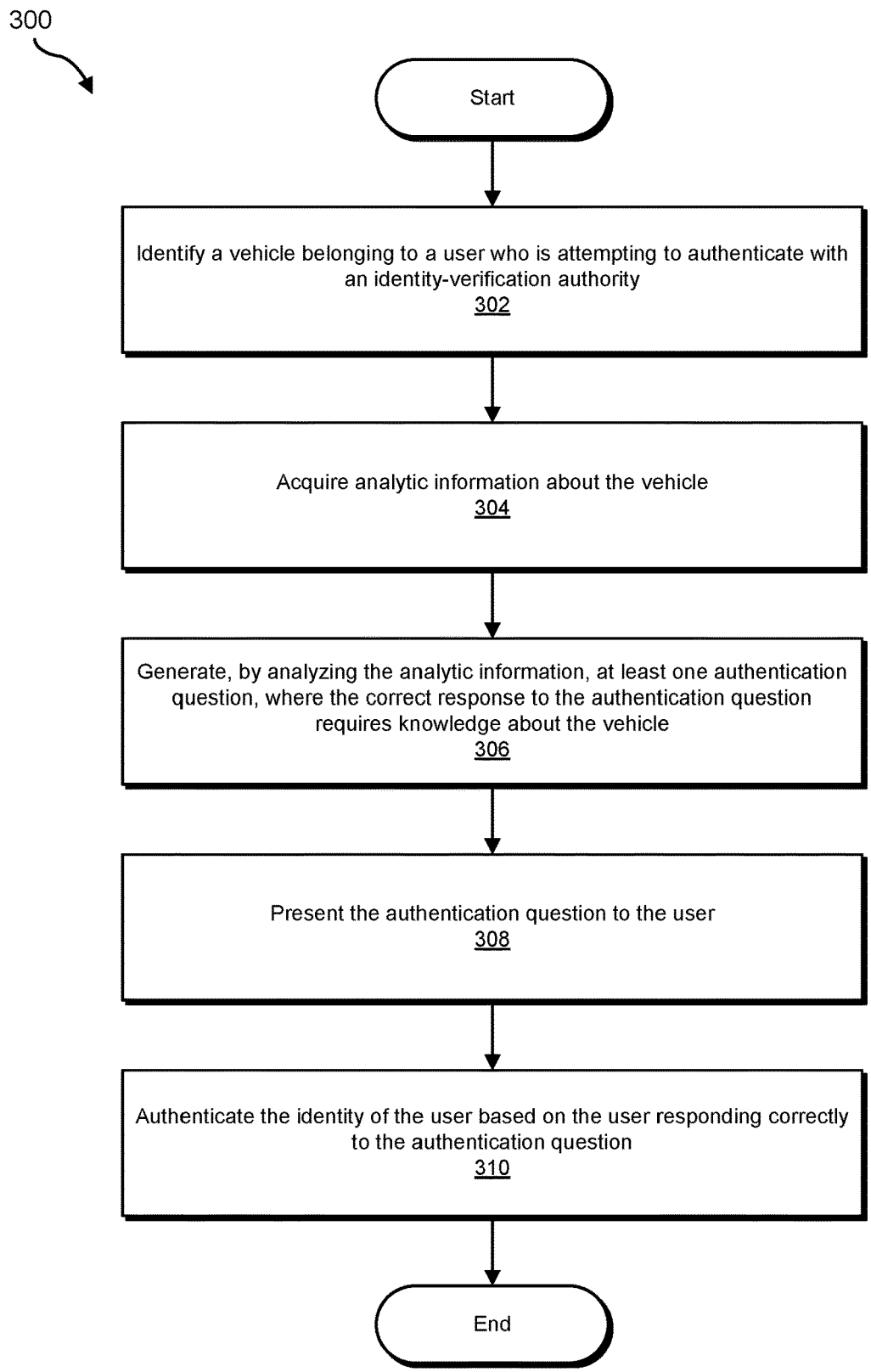
FIG. 3 is a flow diagram of an exemplary method for using vehicles as information sources for knowledge-based authentication.

FIG. 3 is a flow diagram of an exemplary computer-implemented method 300 for using vehicles as information sources for knowledge-based authentication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a vehicle belonging to a user who is attempting to authenticate with an identity-verification authority. For example, identification module 104 may, as part of server 206 in FIG. 2, identify vehicle 208 belonging to user 210 who is attempting to authenticate with identity-verification authority 212.

Identification module 104 may identify a vehicle belonging to the user in a variety of ways. For example, identification module 104 may identify the vehicle belonging to the user by requesting personally identifying information from the user. For example, identification module 104 may request that user 210 input a Vehicle Identification Number (VIN). Additionally or alternatively, identification module 104 may request the user's social security number, name, date of birth, home address, and/or any other personally identifying information that may be used to identify a vehicle belonging to user 210. Additionally or alternatively, identification module 104 may skim information about the user based on a computing device that the user is using in their attempt to authenticate with identity-verification authority 212. For example, many mobile phones have unique identifier numbers (e.g., a serial number, International Mobile Station Equipment Identity (IMEI), and/or Media Access Control (MAC) address) that can be tied to a user's phone bill and thus be used to automatically retrieve personally identifying information about the user.

Identification module 104 may utilize this personally identifying information to search a variety of databases and/or registries in order to identify a vehicle belonging to user 210. For example, identification module 104 may automatically identify the vehicle belonging to the user by querying a government-managed database of vehicle owners, such as an ownership registry maintained by a DEPARTMENT OF MOTOR VEHICLES. Additionally or alternatively, identification module 104 may search a privately held database of vehicle owners such as those that might be maintained by an auto dealership. In situations where identification module 104 identifies more than one vehicle belonging to user 210, identification module 104 may use a variety of methods to select which vehicle to use as vehicle 208. For example, identification module 104 may select a vehicle belonging to the user at random, prompt user 210 for which vehicle to use, or select a vehicle based on known communication and/or network capabilities of the vehicle.

Verifying the communication capabilities of a vehicle may be especially useful in cases where a user owns multiple vehicles. For example, a user may own both a modern vehicle equipped with a variety of communications features in addition to an older vehicle that may not be able to provide analytic information to server 206. Identification module 104 may accordingly refrain from selecting the older vehicle as vehicle 208, as the older vehicle may be unable to provide the necessary analytic information to other elements of modules 102. Furthermore, there may be situations in which the communications capability of a vehicle model are unknown or unproven to work with one or more of modules 102, and thus identification module 104 may instead select a different a vehicle as vehicle 208.

In some examples, the identity-verification authority may provide plug-in hardware to the user. This hardware may attach to, for example, a diagnostic port of the vehicle, and provide vehicle information to one or more of modules 102. Identification module 104 may use information provided by the plug-in hardware, such as a device identifier, to identify the vehicle as vehicle 208 belonging to user 210. Additionally and as will be described in greater detail below, this hardware may provide analytic information about the vehicle to one or more of modules 102.

There may be situations in which identification module 104 cannot identify an appropriate vehicle to use based on the information it has access to. In such cases, identification module 104 may perform a variety of remediation steps, such as requesting additional personally identifying information from the user, expanding the number and/or types of databases queried, requesting that the user confirm a vehicle automatically identified by identification module 104, and/or informing the user and/or authentication authority that vehicle-based authentication is not a viable option for this particular user. Once identification module 104 identifies a compatible vehicle belonging to the user, one or more of modules 102 may collect information from vehicle 208.

At step 304 in FIG. 3, one or more of the systems described herein may acquire analytic information about the vehicle. For example, acquisition module 106 may, as part of server 206 in FIG. 2, acquire analytic information 216 about vehicle 208.

Acquisition module 106 acquire analytic information 216 in a variety of ways and/or contexts. In some examples, vehicle 208 may constantly stream or otherwise transmit analytic information on a regular basis to acquisition module 106. Additionally or alternatively, vehicle 208 may initiate a data transmission when requested to do so by acquisition module 106. Regardless of the context in which acquisition module 106 receives analytic information, acquisition module 106 may acquire the analytic information by storing the analytic information in association with the time at which the analytic information was collected, utilizing these time points as further sources of information by which other elements of modules 102 may generate authentication questions, as will be described in greater detail below. Furthermore, in some examples, acquisition module 106 may acquire the analytic information by receiving an aggregate report of analytic information from the vehicle that contains data from more than one sensor of the vehicle, or even a digest report that contains data collected over a particular span of time (e.g., a day or a week).

In some embodiments, acquisition module 106 may acquire the analytic information from the vehicle via a wireless network. For example, vehicle 208 may include wireless communication capabilities, allowing vehicle 208 to transmit data through a user's home wireless network. Additionally or alternatively, vehicle 208 may transmit data through a cellular network (e.g., a Global System for Mobile Communications (GSM) network).

Even if vehicle 208 is not by default equipped with wireless communication capabilities, a user may equip vehicle 208 with hardware such as the plug-in hardware described above, which may include wireless communication capabilities. Additionally or alternatively, vehicle 208 may include a short-range wireless network access point (e.g., a BLUETOOTH network device) that is generally used to allow mobile devices to interact with vehicle hardware. A mobile device paired with such a short-range wireless network may be programmed with an application that is able to retrieve analytic information from the vehicle and then provide the information to acquisition module 106. In these examples, the acquisition module 106 may receive the analytic information from vehicle 208 as facilitated by the plug-in hardware or mobile device.

In some embodiments, vehicle 208 may digitally sign analytic information 216 before providing analytic information 216 to acquisition module 106. For example, vehicle 208 may be equipped with a trusted platform module that enables vehicle 208 to securely provide analytic information to a computing device remote from the vehicle by digitally signing the analytic information before transmitting the analytic information. In the case that vehicle 208 indirectly provides the analytic information to acquisition module 106 via plug-in or mobile devices as described above, these devices may be equipped with a trusted platform module or use some other method of securely providing information to acquisition module 106. Vehicle 208 may additionally or alternatively use any other suitable method for securely transmitting data from one computing device to another.

As described above, analytic information 216 may contain a variety of data, including but not limited to a fuel gauge reading, an odometer reading, physical location or navigation information, a list of recently played radio stations, a list of media played through an onboard entertainment system, efficiency information (e.g., miles-per-gallon), transponder information, a list of devices paired to an internal network that is integrated with the vehicle, the time at which data was collected, or any other suitable data collected by sensors either integrated with or attached to the vehicle.

At step 306, one or more of the systems described herein may generate, by analyzing the analytic information about the vehicle, at least one authentication question. The correct response to the authentication question may require specific knowledge about the vehicle. For example, generation module 108 may, as part of server 206 in FIG. 2, generate, by analyzing analytic information 216 about vehicle 208, at least one authentication question 218. In this example, the correct response to authentication question 218 requires specific knowledge about vehicle 208.

Generation module 108 may derive authentication question 218 in a variety of ways. In some examples, generation module 108 may simply use a current gauge or meter reading of vehicle 208 to generate authentication question 218, resulting in a question such as "what is the current odometer reading of your vehicle, to the nearest hundred miles?" Generation module 108 may also generate more complex questions using multiple dimensions of data. For example, generation module 108 may utilize a combination of location tracking information along with knowledge of what mobile devices are paired to the vehicle's onboard network. For example, if analytic information details that the vehicle travelled to a mall at a particular time and had the user's mobile phone paired to the vehicle's onboard network during transit to and from the mall, generation module 108 may produce a question such as "when was the last time you went to the mall?" Naturally, generation module 108 may use any amount of data collected over any amount of time to produce authentication questions of varying complexity.

Figure 4:
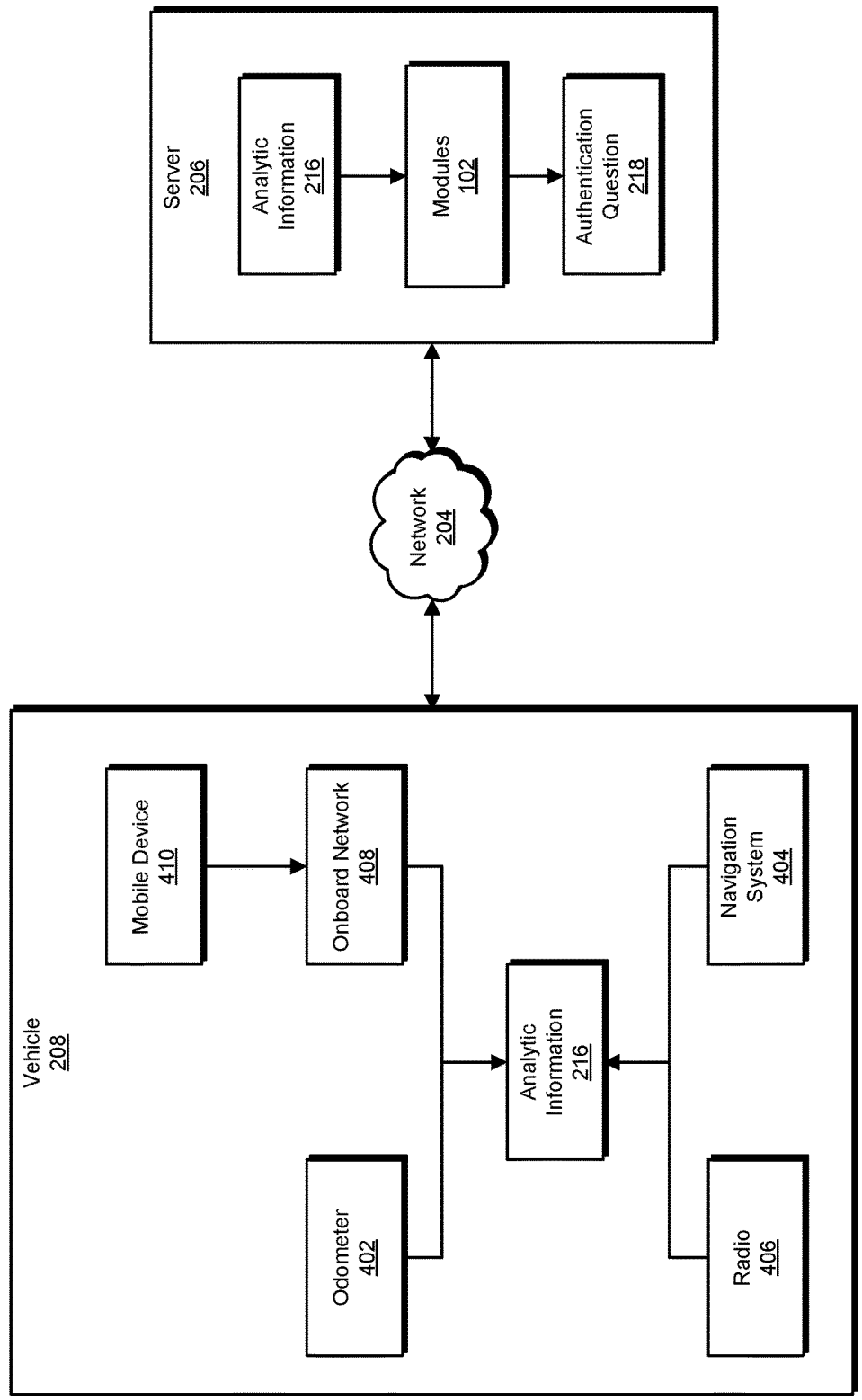
FIG. 4 is a block diagram of an exemplary computing system for generating authentication questions based on information derived from a vehicle.

An illustrated example of this process is shown in connection with FIG. 4. As shown, analytic information 216 may include information from various systems of vehicle 208, including odometer 402, onboard network 408, radio 406, and navigation system 404. Other examples of analytic information not illustrated here may contain readings from other sensors, such as seat pressure sensors, collision sensors, speedometers, tire pressure gauges, transponders, or any other sensor that captures information about the vehicle. As described above, vehicle 208 may then provide analytic information 216 to acquisition module 106, which in the example of FIG. 4 is operating as part of server 206. Generation module 108 may then use analytic information 216 to generate authentication question 218. Specifically, authentication question 218 may include detailed questions about the state or usage of various systems of vehicle 208, such as radio stations played through radio 406, locations visited as determined by navigation system 404, distance travelled as shown by odometer 402, or devices such as mobile device 410 paired to vehicle 208 through onboard network 408.

Returning to FIG. 3 at step 308, one or more of the systems described herein may present the authentication question to the user. For example, presentation module 110 may, as part of server 206 in FIG. 2, present authentication question 218 to user 210.

Presentation module 110 may present authentication question 218 to user 210 in a variety of contexts. In some examples, presentation module 110 may be integrated with an online form and add authentication question 218 to an identity-verification page that is then served to the user's web browser. Alternatively, presentation module 110 may operate as part of a question-generation service that generates and provides authentication questions as well as the correct response to a variety of identity-verification authorities. The identity-verification authorities may then use this information to authenticate the identity of the user. Moreover, presentation module 110 (as well as other elements of modules 102, such as authentication module 112) may operate as part of a secure service that verifies a user's identity before granting the user access to the secure service.

Figure 5:
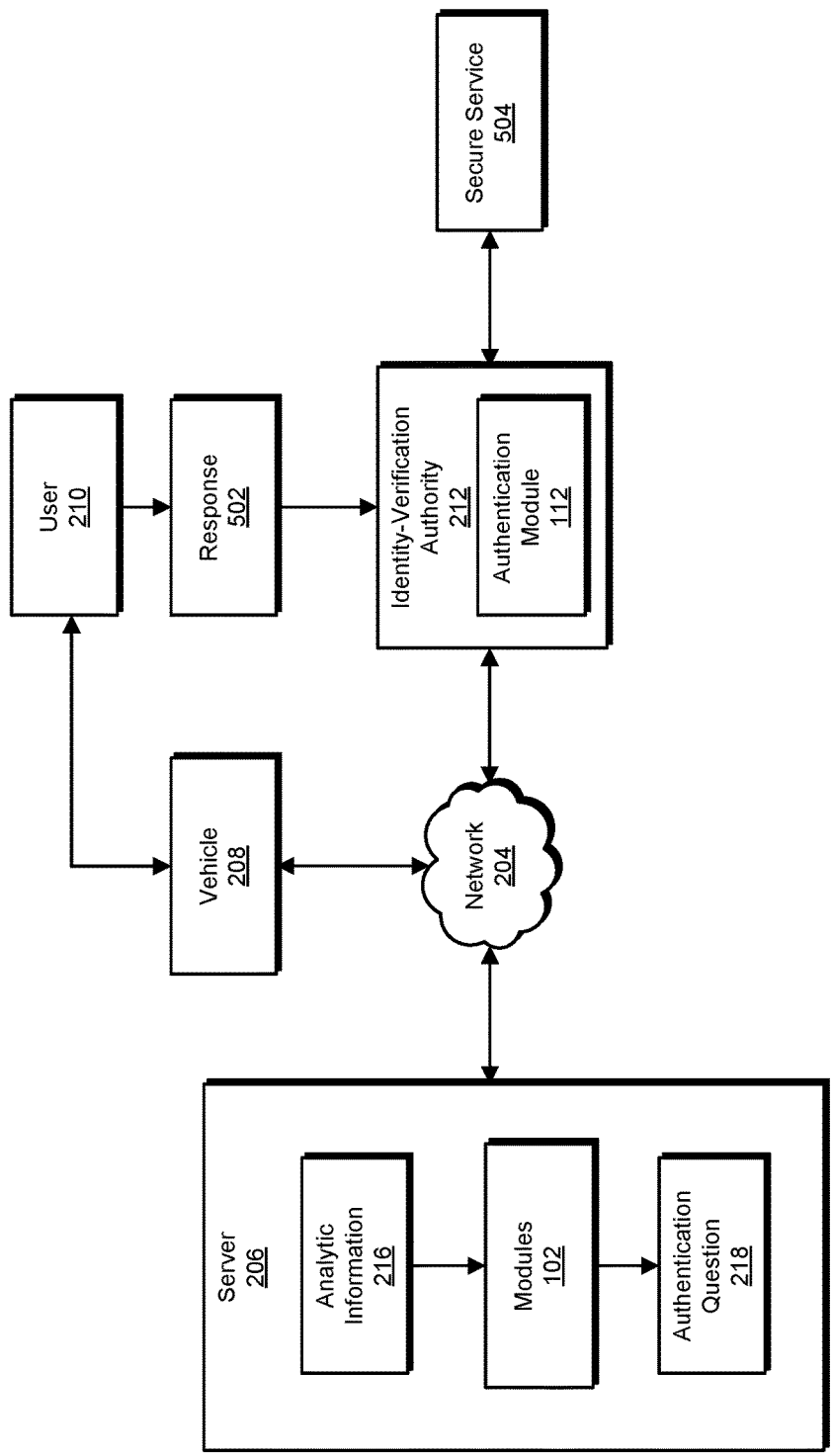
FIG. 5 is a block diagram of an exemplary computing system for verifying a user's identity using a vehicle as an information source for knowledge-based authentication.

An illustration of one embodiment is provided in connection with FIG. 5. As shown, network 204 may facilitate communications between server 206, vehicle 208, and identity-verification authority 212. In this example, identity-verification authority is operating as part of a computing system separate and distinct from server 206, unlike the example shown in FIG. 2. Identity-verification authority 212 may control access to a secure service 504 that requires users to prove or verify their identity before granting them access to secure service 504. Examples of secure service 504 include, without limitation, online banking services, online healthcare information services, online employment and/or government benefits services, or any other digital service that wishes to verify the identity of users.

User 210 may wish to access secure service 504, and thus be required to verify their identity through identity-verification authority 212. Identity-verification authority 212 may request an authentication question from server 206, which may use analytic information 216 to generate authentication question 218. Identity-verification authority 212 may receive authentication question 218 from server 206, and presentation module 110 may, as part of identity-verification authority 212, present user 210 with authentication question 218. User 210 may reply with response 502, and authentication module 112 may verify user 210 based on whether or not response 502 matches the correct response to authentication question 218. This authentication process will be described in greater detail below.

Returning to FIG. 3 at step 310, one or more of the systems described herein may authenticate the identity of the user based on the user responding correctly to the authentication question. For example, authentication module 112 may, as part of server 206 in FIG. 2, authenticate the identity of user 210 based on user 210 responding correctly to authentication question 218.

Authentication module 112 may use a variety of methods to confirm that the user responded correctly to the authentication question. For example, one or more of modules 102 may maintain a database of authentication questions (including authentication question 218) in conjunction with the correct answer to each question and the user whose vehicle was used to generate the questions. Alternatively, modules 102 may generate authentication questions and the associated correct answers "on-demand" when a system such as identity-verification authority 212 needs to verify the identity of a user. Authentication module 112 may then discard the generated authentication question after use. By not maintaining a persistent database of authentication questions, the systems and methods described herein may add an additional layer of difficulty should an attacker wish to pose as a valid user. In some embodiments, one or more of modules 102 may store the correct answer to the authentication questions in a hash or other encrypted format in order to protect the privacy of the user. In these embodiments, authentication module 112 may apply the same hash or encryption function to the user's response and compare the result of the encryption function to the encrypted correct answer. Should the user's response match the correct response, authentication module 112 may then authenticate user 210 based on user 210 responding correctly to authentication question 218.

For example and returning to FIG. 5, authentication module 112 may compare response 502 provided by user 210 to a database that contains authentication question 218 and the corresponding correct response. If response 502 matches the stored correct response, then authentication module 112 may confirm with identity-verification authority 212 that user 210 is who they declare themselves to be, causing identity-verification authority 212 to grant user 210 access to secure service 504.

As described above, systems and methods herein may use a person's vehicle as an information source to generate knowledge-based authentication questions by which to verify a user's identity. Systems and methods described herein may use data gathered from the vehicle to dynamically generate questions that only a user with access to the vehicle would be able to answer, thus providing identity-verification authorities with secure methods by which to verify a user's identity.

Figure 6:
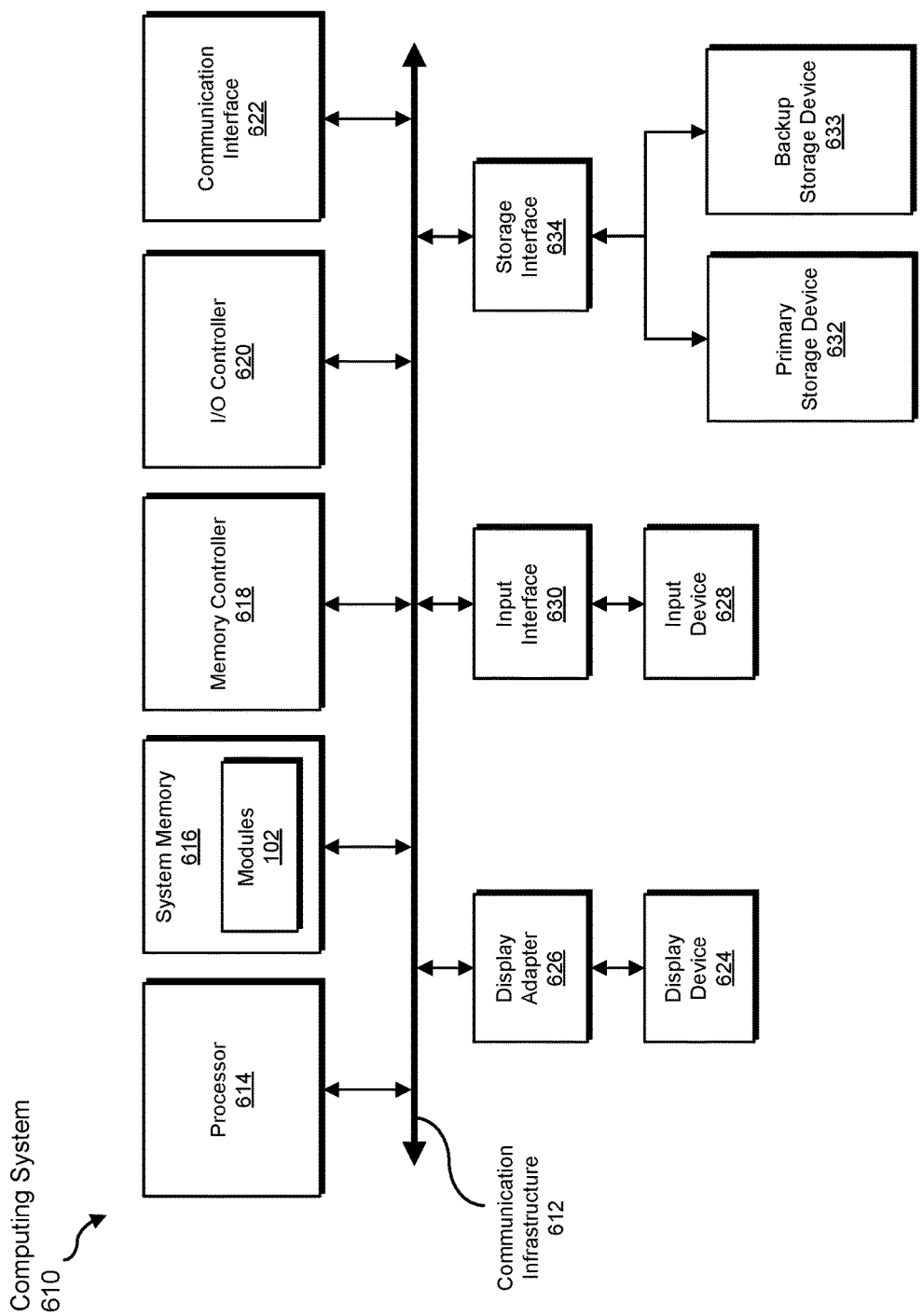
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
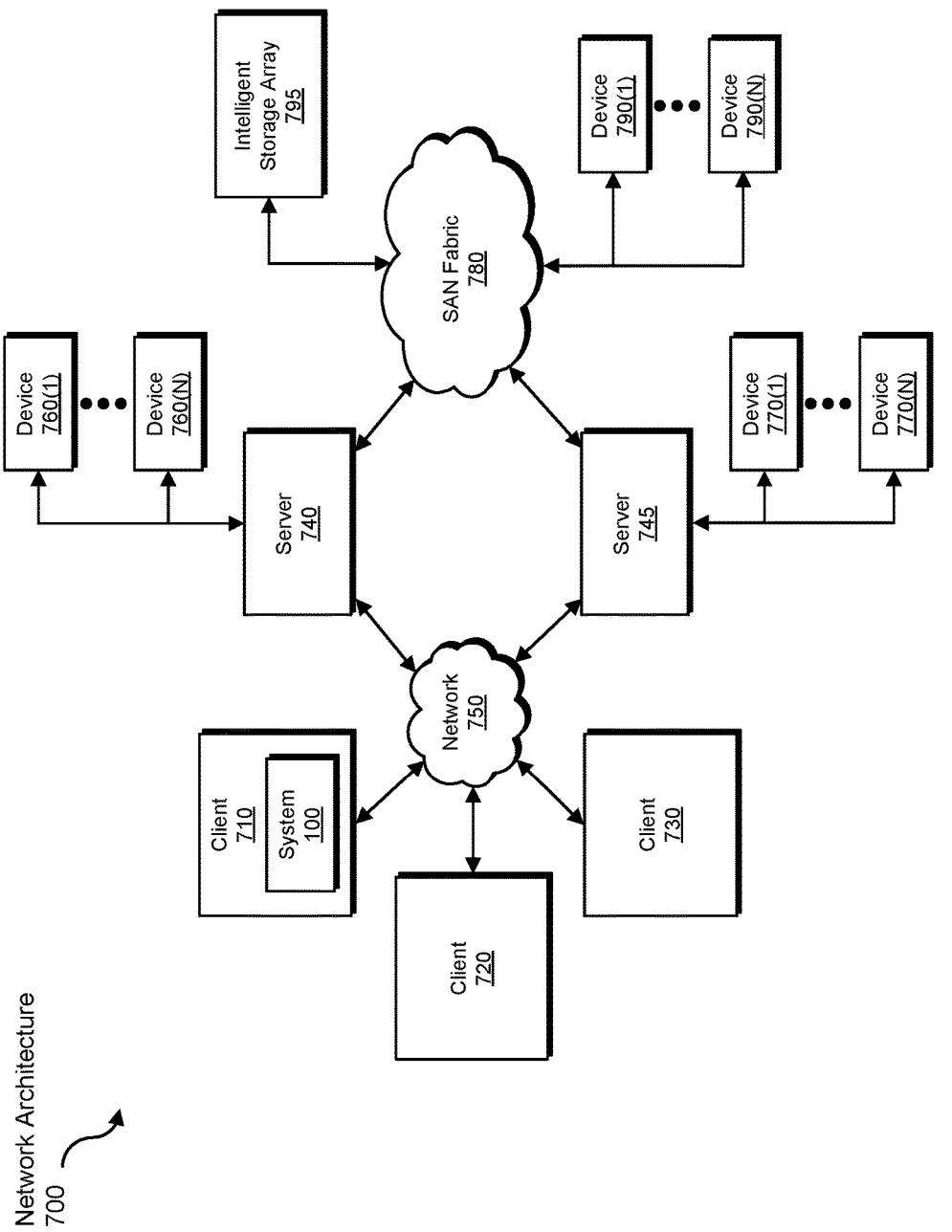
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for using vehicles as information sources for knowledge-based authentication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive analytic information from a vehicle to be transformed, transform the analytic data into authentication questions, output a result of the transformation to a display interface, thus enabling a user to respond to the authentication questions, receive a response from the user, and use the response from the user to verify the identity of the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for using vehicles as information sources for knowledge-based authentication, at least a portion of the method being performed by a computing device comprising at least one processor, the method comprising:
   determining that a user is attempting to authenticate, over a network, an identity with an identity-verification authority that controls access to a secure digital service;
   in response to determining that the user is attempting to authenticate the identity with the identity-verification authority, identifying, based at least in part on querying a government-managed database of vehicle owners using personally identifying information associated with the identity, a vehicle that belongs to an individual represented by the identity;
   acquiring, from the vehicle, analytic information about the vehicle;
   generating, by analyzing the analytic information acquired from the vehicle, at least one knowledge-based authentication question, wherein a correct response to the knowledge-based authentication question requires knowledge about the vehicle that demonstrates direct physical access to the vehicle;
   testing whether the user has direct physical access to the vehicle by presenting the knowledge-based authentication question to the user;
   authenticating the identity as the identity of the user based on the user responding correctly to the knowledge-based authentication question, wherein the user responding correctly to the knowledge-based authentication question demonstrates that the user has direct physical access to the vehicle; and
   granting, based on authenticating the identity of the user, the user access to the secure digital service.

2. The method of claim 1, wherein identifying the vehicle that belongs to the individual represented by the identity comprises requesting the personally identifying information from the user.

3. The method of claim 1 wherein acquiring the analytic information from the vehicle comprises the vehicle digitally signing the analytic information before transmitting the analytic information.

4. The method of claim 3, wherein the vehicle is equipped with a trusted platform module that enables the vehicle to securely provide analytic information to a computing device remote from the vehicle by digitally signing the analytic information before transmitting the analytic information.

5. The method of claim 1, wherein acquiring the analytic information comprises the vehicle transmitting the analytic information via a wireless network.

6. The method of claim 1, wherein acquiring the analytic information comprises storing the analytic information in association with the time at which the analytic information was collected.

7. The method of claim 1, wherein acquiring the analytic information comprises receiving an aggregate report of analytic information from the vehicle that contains data from more than one sensor of the vehicle.

8. The method of claim 1, wherein the analytic information comprises at least one of:
   a fuel gauge reading;
   an odometer reading;
   physical location information;
   a list of recently played radio stations;
   a list of media played through an onboard entertainment system;
   transponder information; and
   a list of devices paired to an internal network that is integrated with the vehicle.

9. A system for using vehicles as information sources for knowledge-based authentication, the system comprising:
   a determination module, stored in a memory of the system, that determines that a user is attempting to authenticate, over a network, an identity with an identity-verification authority that controls access to a secure digital service;
   an identification module, stored in the memory, that, in response to determining that the user is attempting to authenticate the identity with the identity-verification authority, identifies, based at least in part on querying a government-managed database of vehicle owners using personally identifying information associated with the identity, a vehicle that belongs to an individual represented by the identity;
   an acquisition module, stored in memory, that acquires, from the vehicle, analytic information about the vehicle;
   a generation module, stored in memory, that generates, by analyzing the analytic information acquired from the vehicle, at least one knowledge-based authentication question, wherein a correct response to the knowledge-based authentication question requires knowledge about the vehicle that demonstrates direct physical access to the vehicle;
   a presentation module, stored in memory, that tests whether the user has direct physical access to the vehicle by presenting the knowledge-based authentication question to the user;
   an authentication module, stored in memory, that:
   authenticates the identity as the identity of the user based on the user responding correctly to the knowledge-based authentication question, wherein the user responding correctly to the knowledge-based authentication question demonstrates that the user has direct physical access to the vehicle; and
   grants, based on authenticating the identity of the user, the user access to the secure digital service; and
   at least one physical processor configured to execute the determination module, the identification module, the acquisition module, the generation module, the presentation module, and the authentication module.

10. The system of claim 9, wherein the identification module identifies the vehicle that belongs to the individual represented by the identity by requesting personally identifying information from the user.

11. The system of claim 9, wherein the vehicle digitally signs the analytic information before providing the analytic information to the acquisition module.

12. The system of claim 11, wherein the vehicle is equipped with a trusted platform module that enables the vehicle to securely provide analytic information to a computing device remote from the vehicle by digitally signing the analytic information before transmitting the analytic information.

13. The system of claim 9, wherein the vehicle transmits the analytic information via a wireless network.

14. The system of claim 9, wherein the acquisition module acquires the analytic information by storing the analytic information in association with the time at which the analytic information was collected.

15. The system of claim 9, wherein the acquisition module acquires the analytic information by receiving an aggregate report of analytic information from the vehicle that contains data from more than one sensor of the vehicle.

16. The system of claim 9, wherein the analytic information comprises at least one of:
 a fuel gauge reading;
 an odometer reading;
 physical location information;
 a list of recently played radio stations;
 a list of media played through an onboard entertainment system;
 transponder information; and
 a list of devices paired to an internal network that is integrated with the vehicle.

17. A non-transitory computer-readable medium comprising one or more computer-readable instructions that, when executed by at least one processor of a computing device, cause the computing device to:
 determine that a user is attempting to authenticate, over a network, an identity with an identity-verification authority that controls access to a secure digital service;
 in response to determining that the user is attempting to authenticate the identity with the identity-verification authority, identify, based at least in part on querying a government-managed database of vehicle owners using personally identifying information associated with the identity, a vehicle that belongs to an individual represented by the identity;
 acquire, from the vehicle, analytic information about the vehicle;
 generate, by analyzing the analytic information acquired from the vehicle, at least one knowledge-based authentication question, wherein a correct response to the knowledge-based authentication question requires knowledge about the vehicle that demonstrates direct physical access to the vehicle;
 test whether the user has direct physical access to the vehicle by presenting the knowledge-based authentication question to the user;
 authenticate the identity as the identity of the user based on the user responding correctly to the knowledge-based authentication question, wherein the user responding correctly to the knowledge-based authentication question demonstrates that the user has direct physical access to the vehicle; and
 grant, based on authenticating the identity of the user, the user access to the secure digital service.

18. The non-transitory computer-readable medium of claim 17, wherein the one or more computer-readable instructions cause the computing device to identify the vehicle that belongs to the individual represented by the identity by requesting the personally identifying information from the user.

\* \* \* \* \*